(12) United States Patent
Hayashi et al.

(10) Patent No.: US 6,789,902 B2
(45) Date of Patent: Sep. 14, 2004

(54) PROJECTION OPTICAL SYSTEM AND PROJECTOR USING THE SAME

(75) Inventors: Kohtaro Hayashi, Toyonaka (JP); Tomokazu Masubuchi, Osaka (JP); Tomokazu Taguchi, Sakai (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 10/354,304

(22) Filed: Jan. 30, 2003

(65) Prior Publication Data

US 2003/0151725 A1 Aug. 14, 2003

(30) Foreign Application Priority Data

Feb. 13, 2002 (JP) ........................................ 2002-035011

(51) Int. Cl.[7] ........................... G03B 21/14; G03B 21/26
(52) U.S. Cl. ............................. 353/20; 353/31; 353/34
(58) Field of Search ............................ 353/20, 31, 33, 353/34, 37, 81; 349/5, 6, 7, 8, 9

(56) References Cited

U.S. PATENT DOCUMENTS

| | | | |
|---|---|---|---|
| 5,267,029 A | * 11/1993 | Kurematsu et al. | 348/751 |
| 6,176,586 B1 | 1/2001 | Hirose et al. | 353/31 |
| 6,273,567 B1 | 8/2001 | Conner et al. | 353/20 |
| 6,343,864 B1 | 2/2002 | Tajiri | 353/20 |
| 6,402,323 B1 | * 6/2002 | Shiue et al. | 353/20 |
| 6,626,540 B2 | * 9/2003 | Ouchi et al. | 353/31 |

FOREIGN PATENT DOCUMENTS

| | | |
|---|---|---|
| JP | 11-271683 A | 10/1999 |
| JP | 2001-154268 A | 6/2001 |
| JP | 2001-174755 A | 6/2001 |

\* cited by examiner

*Primary Examiner*—Christopher E Mahoney
(74) *Attorney, Agent, or Firm*—Sidley Austin Brown & Wood LLP

(57) ABSTRACT

A projection optical system has three LCLVs; a first color-separating mirror for separating a substantially polarized light into a first and second color lights and a third color light; a half-wave plate for rotating the polarization direction of either one(s) of the separated light; a second color-separating mirror for synthesizing the first and the third color light, and further, separating the second color light; a first PBS for separating the first and third color lights and illuminating the first and third LCLVs, respectively, and synthesizing image lights from the first and third LCLVs; a second PBS for illuminating the second LCLV and emitting a image light modulated by the second LCLV; a half-wave plate disposed external to output surface of the first PBS; and a third PBS for synthesizing three image lights, the third PBS has a dicroic characteristics and a polarization characteristics.

24 Claims, 12 Drawing Sheets

PROJECTION OPTICAL SYSTEM AND PROJECTOR USING THE SAME

This application is based on the application No. 2002-035011 filed in Japan on Feb. 13, 2002, the entire content of which is hereby incorporated by reference.

BACKGROUND OF THE INVENTION

1. Field of the Invention

The present invention relates to a projection optical system, in which a light beam emitted from a light source is decomposed into light beams of three primary colors (i.e., red, blue and green), which illuminate three reflection type liquid crystal light valves (hereinafter abbreviated as "LCLVs"), and then, images generated respectively by the LCLVs are synthesized into a single image to be thus projected. Furthermore, the present invention relates to a projector using the above-described projection optical system.

2. Description of the Related Art

There has been known an optical system disclosed in, for example, Japanese Patent Application Laid-open No. 271, 683/1999 (hereinafter abbreviated as "JP '683") as a projection optical system for synthesizing images generated by three LCLVs.

FIG. 14, which corresponds generally to FIG. 1 of JP '683, discloses an optical system including a color-separating section, an image-generating section, and an image-synthesizing section. The color-separating section includes: a first color-separating mirror 401 for separating a white polarized optical beam $W_s$ into a blue light beam $B_s$ and a yellow light beam including a green light beam $G_s$ and a red light beam $R_s$; a half-wave plate 406 for rotating the polarization direction of the blue light beam $B_s$ 90 degrees; a second color-separating mirror 402 for synthesizing the green light beam $G_s$ and the blue light beam $B_p$ while separating the red light beam $R_s$. The image-generating section includes: a first LCLV 411 for modulating the red color light beam $R_s$ thus generating a red image light beam; a second LCLV 412 for modulating the green color light beam $G_s$ thus generating a green image light beam; a third LCLV 414 for modulating the blue color light beam $B_p$ thus generating a blue image light beam. The image-synthesizing section includes: a first polarizing beam splitter (hereinafter abbreviated as "PBS") 409 for separating the green light beam $G_s$ and the blue light beam $B_p$, so as to guide the separated light beams to the second LCLV 412 and the third LCLV 413, respectively, and further, for synthesizing each of the image light beams reflected on the LCLVs 412 and 413, respectively, with each other; a second PBS 410 for guiding the red light beam to the first LCLV 411 and emitting the first image light beam $R_p$ reflected on the first LCLV 411; a second phase plate 407, disposed external to an output surface of the first PBS 409, for rotating the red image light beam $R_p$ 90 degree; a dichroic prism 414 for synthesizing the green and blue image light beams, $G_p$ and $B_p$, emitted from the first PBS 409 and the red light beam $R_p$ emitted from the second phase plate 407 with each other; three band-pass filters 511, 512, and 513 for eliminating an unwanted another color light beam, respectively. Here, the image light beam is a light component having image information out of light beams modulated by the LCLV. Additionally, subscript p means P polarized light, and subscript s means S polarized light.

However, the contrast of an image still has plenty of room for improvement in the optical system disclosed in JP '683. The image-synthesizing section in the projection optical system is configured such that the blue image light beam is reflected on the PBS 409, to be thus emitted toward the dichroic prism 414. In view of the characteristics of the PBS, S polarized light beam is perfectly reflected on PBS, and so, a transmitted P polarized light beam has a great polarization degree. But, as transmittance of a P polarized light beam is not 100 percent, P polarized light beam which should be inherently transmitted is reflected by several percentages, and then, the reflected P polarized light beam is mixed into a reflected S polarized light beam. The blue image light beam contains an unnecessary P polarized light beam, and so, the contrast of the blue image is degraded.

SUMMARY OF THE INVENTION

The present invention has been accomplished in an attempt to solve the above problems observed in the prior art. An object of the present invention is to provide a projection optical system that high contrast image can be obtained. Furthermore, another object of the present invention is to provide a projector having the above-described projection optical system.

In order to achieve the above-described objects, a first projection optical system according to the present invention includes: a first color-separating mirror for separating a substantially polarized light into a first color light and a color light including a second color light and a third color light; a first phase plate for rotating a plane of polarization of the color light or the third color light; a second color-separating mirror for synthesizing the first color light and the third color light with each other and separating the second color light; a first LCLV for modulating the first color light thus generating a first image light; a second LCLV for modulating the second color light thus generating a second image light; a third LCLV for modulating the third color light thus generating a third image light; a first PBS for separating the first color light and the third color light from each other, so as to guide the separated color lights to the first LCLV and the third LCLV, respectively, and for synthesizing the first image light and the third image light; a second PBS for guiding the second color light to the second LCLV and emitting the second image light; a second phase plate disposed external to an output surface of the first PBS, the first and third image lights being emitted from the output surface; and a third PBS for synthesizing the first and third image lights emitted from the second phase plate and the second image light emitted from the second PBS.

In order to achieve the above-described objects, a second projection optical system according to the present invention includes: a first LCLV for modulating a first color light thus generating a first image light; a second LCLV for modulating a second color light thus generating a second image light; a third LCLV for modulating a third color light thus generating a third image light; a first PBS for separating the first color light and the third color light different in color and in plane of polarization each other, so as to guide the separated lights to the first LCLV and the third LCLV, respectively, and further, for synthesizing the first image light and the third image light; a second PBS for guiding a polarized second color light to the second LCLV and emitting the second image light; a half-wave plate disposed external to an output surface of the first PBS, the first and third image lights being emitted from the output surface; and a third PBS for synthesizing the first and third image lights emitted from the half-wave plate and the second image light emitted from the second PBS, wherein the third PBS reflects the second image light thereby while passes the first image light therethrough by a dichroic characteristic of the third PBS, and wherein, with respect to the third color light, the third PBS reflects a S polarized light thereby while passes a P polarized light therethrough.

In addition, in order to solve the above-described problems, a projector according to the present invention includes the first projection optical system or the second projection optical system.

BRIEF DESCRIPTION OF THE DRAWINGS

These and other objects, advantages and features of the invention will become apparent from the following description thereof taken in conjunction with the accompanying drawings, in which.

DETAILED DESCRIPTION OF THE PREFERRED EMBODIMENTS

Figure 1:
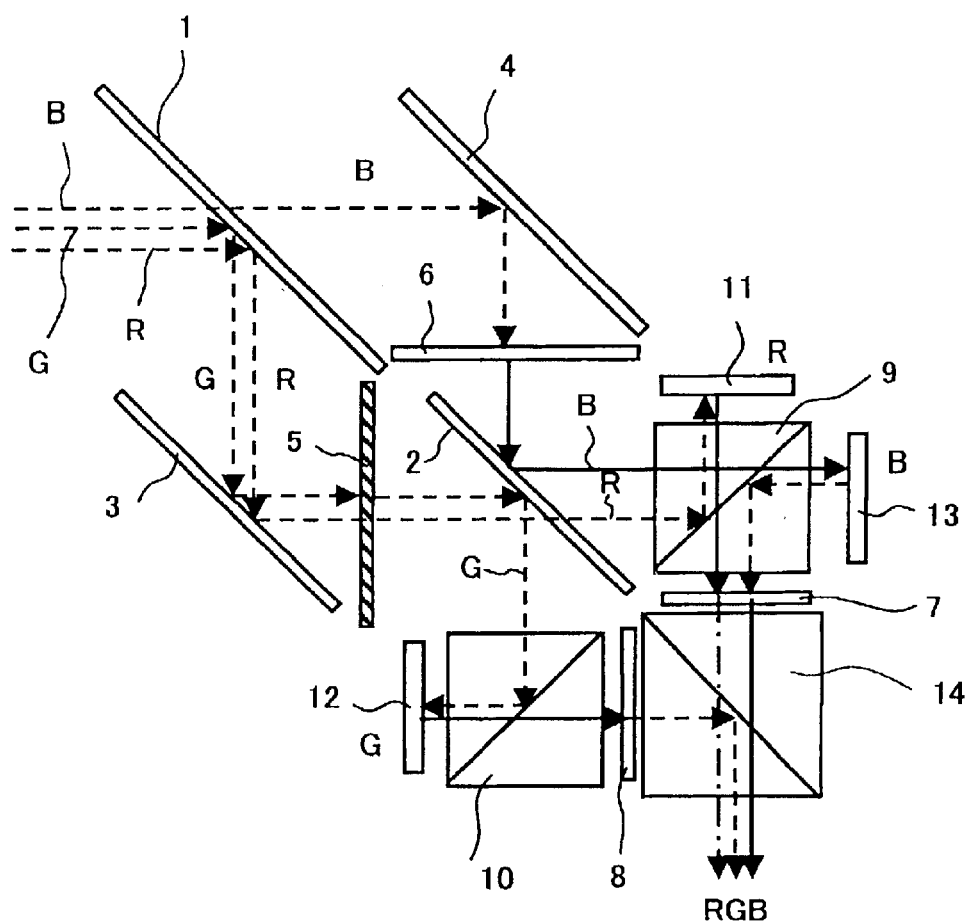
FIG. 1 is a diagram schematically illustrating the basic configuration of a projection optical system according to the present invention.

Modes carrying out the present invention will be described hereinafter in reference to the accompanying drawings. Identical or corresponding parts in the modes carrying out the present invention and preferred embodiments described below are designated by the same reference numerals, and therefore, a duplicate explanation will be omitted appropriately.

First, an explanation will be made on the basic configuration of a projection optical system according to the present invention. A projection optical system is an optical system that separates a white light beam into light beams of three primary colors (i.e., R, G and B) so as to illuminate three LCLVs, and then, synthesizes again respective light beams reflected from the LCLVs on the same optical axis. Images corresponding to the colors are generated by the LCLVs, respectively. These images are synthesized with each other, and then, are projected on a screen by an imaging optical system, for example a projection lens.

FIG. 1 is a diagram schematically illustrating the basic configuration of a projection optical system according to the present invention. In FIG. 1, solid arrows indicate a P polarized light beam, in which a polarization direction is parallel to the plane of the drawing sheet. Furthermore, broken arrows indicate S polarized light beam, in which a polarization direction is perpendicular to the plane of the drawing sheet. Moreover, an alternate long and short dashed arrow indicates the mixture of the P polarized light beam and the S polarized light beam.

First, light beams emitted from a light sources, not shown, are converted into S polarized light beams, each having a uniform intensity distribution, by an optical integrator and a polarization/conversion optical system, described later, and then, enter into a first color-separating mirror 1 from the left in FIG. 1, as shown in FIG. 1. The first color-separating mirror 1 is a yellow reflection dichroic mirror, and therefore, reflects a red light beam R and a green light beam G while transmits a blue light beam B. The red light beam R and the green light beam G reflected on the first color-separating mirror 1 are reflected on a reflection mirror 3, and then, enters into a polarizing plate 5. The red light beam R and the green light beam G pass through the polarizing plate 5, so that their planes of polarization are completely aligned into that of the S polarized light beam, and thus, the light beams enter into a second color-separating mirror 2.

In the meantime, the blue light beam B passing through the first color-separating mirror 1 is reflected on another reflection mirror 4, and thereafter, enters into a phase plate 6 serving as a half-wave plate. The plane of polarization of the blue light beam B is rotated at 90° by means of the phase plate 6, so that the blue light beam B enters into the second color-separating mirror 2 as the P polarized light beam.

The second color-separating mirror 2 is a cyan reflection dichroic mirror, and therefore, reflects the blue light beam B and the green light beam G while transmits the red light beam R. The red light beam R passing through the second color-separating mirror 2 and the blue light beam B reflected on the second color-separating mirror 2 enter into a first PBS 9. Here, since the red light beam R is the S polarized light beam, it is reflected on the first PBS 9, so as to illuminate a first LCLV 11. Furthermore, since the blue light beam B is the P polarized light beam, it passes through the first PBS 9, so as to illuminate a third LCLV 13. In the meantime, the green light beam G reflected on the second color-separating mirror 2 enters into a second PBS 10. Here, since the green light beam G is the S polarized light beam, it is reflected on the second PBS 10, so as to illuminate a second LCLV 12.

The LCLV is a two-dimensional space light modulator that can vary the polarization state of the incident light beam by an applied voltage. Light beam reflected by the LCLV has been modulated in polarization state. And, the variations in polarization state by the LCLV can be converted into variations in intensity by arranging a polarizer and an analyzer before and after the optical path of the LCLV, respectively. The first PBS 9 is a polarizer and an analyzer for the first LCLV 11 and the third LCLV 13. The second PBS 10 is a polarizer and an analyzer for the second LCLV 12. An image is generated by changing the applied voltage per pixel on the LCLV. Out of the light beams modulated and reflected by the LCLV, a component, which has image information and is to be projected by a projecting lens, not shown, is referred to as an ON light beam (i.e., an image light beam); and another component, which is not projected and is to be cut by the PBS, is referred to as an OFF light beam.

The blue light beam B, which illuminates the third LCLV 13, is modulated per pixel by the LCLV 13. The ON light beam (i.e., blue image light beam), the plane of polarization of which has been rotated at 90°, and thus, is turned into the S polarized light beam, is reflected on the first PBS 9, and thereafter, enters into a phase plate 7 serving as a half-wave plate. The plane of polarization of the blue image light beam is rotated at 90° by the phase plate 7, and thus, the blue image light beam B is turned into the P polarization, and thereafter, enters into a third PBS 14.

The red light beam R, which illuminates the first LCLV 11, is modulated per pixel by the LCLV 11. The ON light beam (i.e., red image light beam), the plane of polarization of which has been rotated at 90°, and thus, is turned into the P polarized light beam, passes through the first PBS 9, and thereafter, enters into the phase plate 7 (serving as the half-wave plate for the blue color light beam). The red image light beam is turned into almost the S polarized light beam (mixed with the P polarized light beam) by the phase plate 7, and thereafter, enters into the third PBS 14. The reason why the P polarized light beam is mixed into the light beam entering into the third PBS 14 is that the phase plate 7 is used for the blue color, and therefore, it cannot accurately function as the half-wave plate with respect to the red light beam.

Incidentally, a half-wave plate having a slow axis formed at an angle of 45° with respect to the P or S polarization plane is used as the phase plate 7 in the case of a single layer type. Furthermore, a lamination consisting of a half-wave plate having a slow axis formed at an angle of 22.5° with respect to the P or S polarization plane and a half-wave plate having a slow axis formed at an angle of 67.5° may be used as the phase plate 7 in the case of a double layer type. Moreover, a half-wave plate having a slow axis formed at an angle of 0° with respect to the P or S polarization plane additionally laminated on the above-described double layer type may be used as the phase plate 7 in the case of a triple layer type. Other wise, a lamination consisting of a half-wave plate having a slow axis formed at an angle of 15° with respect to the P or S polarization plane, a half-wave plate having a slow axis formed at an angle of 75° and a half-wave plate having a slow axis formed at an angle of 15° may be used as the phase plate 7 in the case of the triple layer type.

The green light beam G, which illuminates the second LCLV 12, is modulated per pixel by the LCLV 12. The ON light beam (i.e., green image light beam), the polarization direction of which has been rotated at 90°, and thus, is turned into the P polarized light beam, passes through the second PBS 10, and thereafter, enters into another phase plate 8 serving as a half-wave plate. The plane of polarization of the green image light beam is rotated at 90° by the phase plate 8, and thus, is turned into the S polarized light beam, and thereafter, enters into the third PBS 14.

Finally, the red image light beam, the green image light beam and the blue image light beam are synthesized together by the third PBS 14, and then, the synthesized image light beam is emitted to a projecting lens, not shown. The third PBS 14 is equipped with a polarization/separation characteristic, by which the third PBS 14 transmits the P polarized light beam while reflects the S polarized light beam with respect to the blue light beam, and a dichroic characteristic, by which the third PBS 14 reflects the green light beam (i.e., the S polarized light beam) while transmits the red light beam (i.e., the S polarized light beam). The third PBS 14 will be described later in detail. Therefore, the third PBS 14 transmits the S polarized red image light beam and the P polarized blue image light beam while reflects the S polarized green image light beam, and thus, synthesizes the image light beams of the three colors together.

As described above, the phase plate 7 serving as the half-wave plate is disposed on optical path between the first PBS 9 and the third PBS 14. The image light beam reflected on the first PBS 9 and emitted from the first PBS 9 (i.e., the blue image light beam in this configuration) is not completely only the ON light beam but mixed with the OFF light beam (the P polarized light beam). This is because that the P polarized light beam is reflected by several percentages owing to the characteristics of a polarization/separation film in PBS. Thus, the plane of polarization of the image light beam is rotated at 90° through the half-wave plate, and thereafter, the image light beam is made to pass through the third PBS 14. The polarization/separation film of the third PBS 14 can set the transmittance of the S polarized light beam as the OFF light beam to 0. As a result, it is possible to enhance the contrast of an image.

The red image light beam passes through the first PBS 9. The green image light beam passes through the second PBS 10. And the blue image light beam passes through the third PBS 14. That is to say, the each image light beam passes through any one(s) of the PBSs at least one time.

Figure 14:
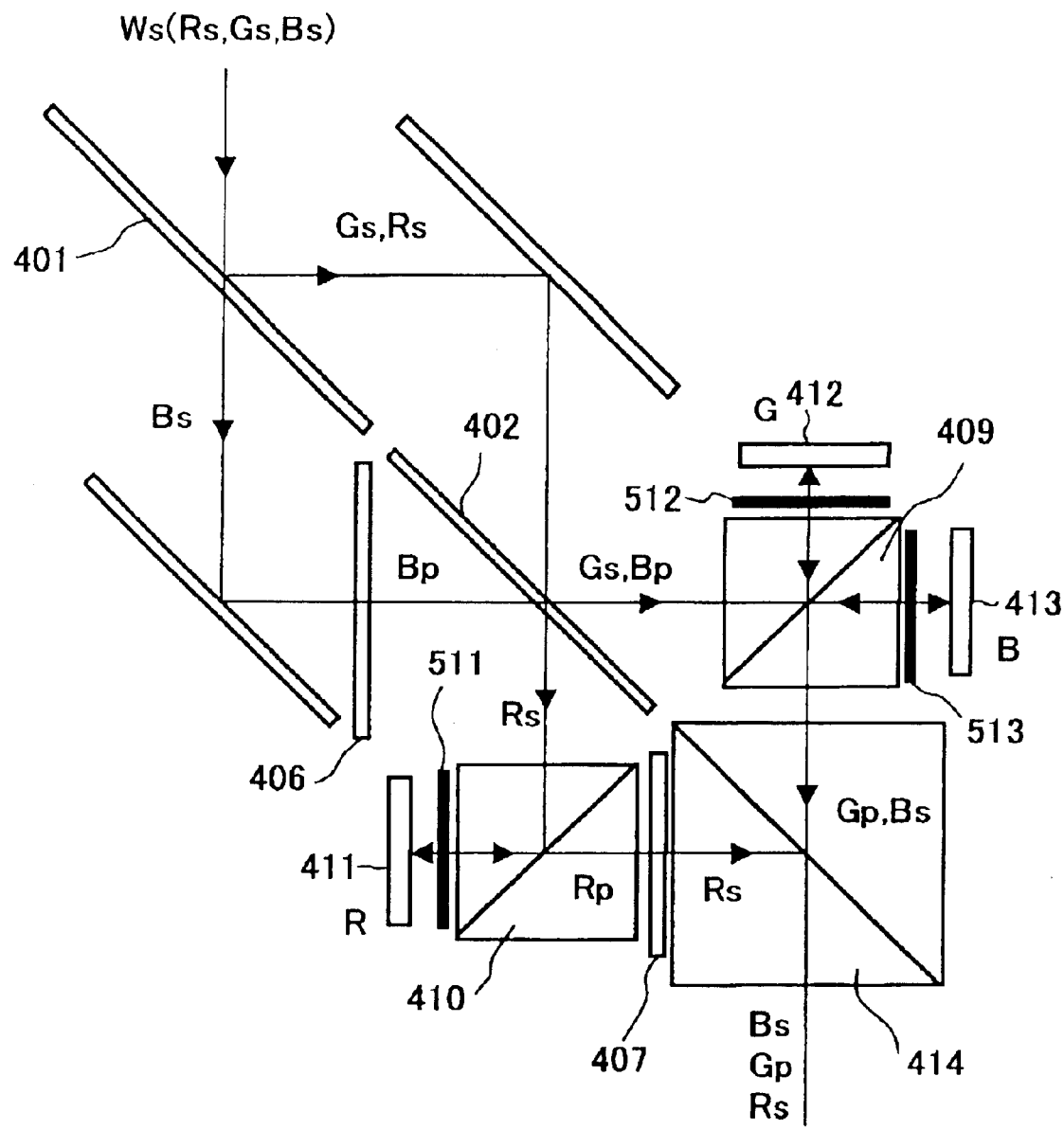
FIG. 14 is a diagram illustrating projection optical systems in the prior art.

In comparison with the projection optical system illustrated in FIG. 14, the use of the third PBS 14 and change of the position of the phase plate 7 can remarkably enhance the contrast, although there is not much difference from the viewpoint of the cost.

In this manner, a dark portion of an image can be darkened more, and thus, an image having a high contrast can be formed. Additionally, since the blue light beam does not require any polarizing plate, no loss is generated due to a polarizing plate. Consequently, the optical utilizing efficiency is high.

Figure 2:
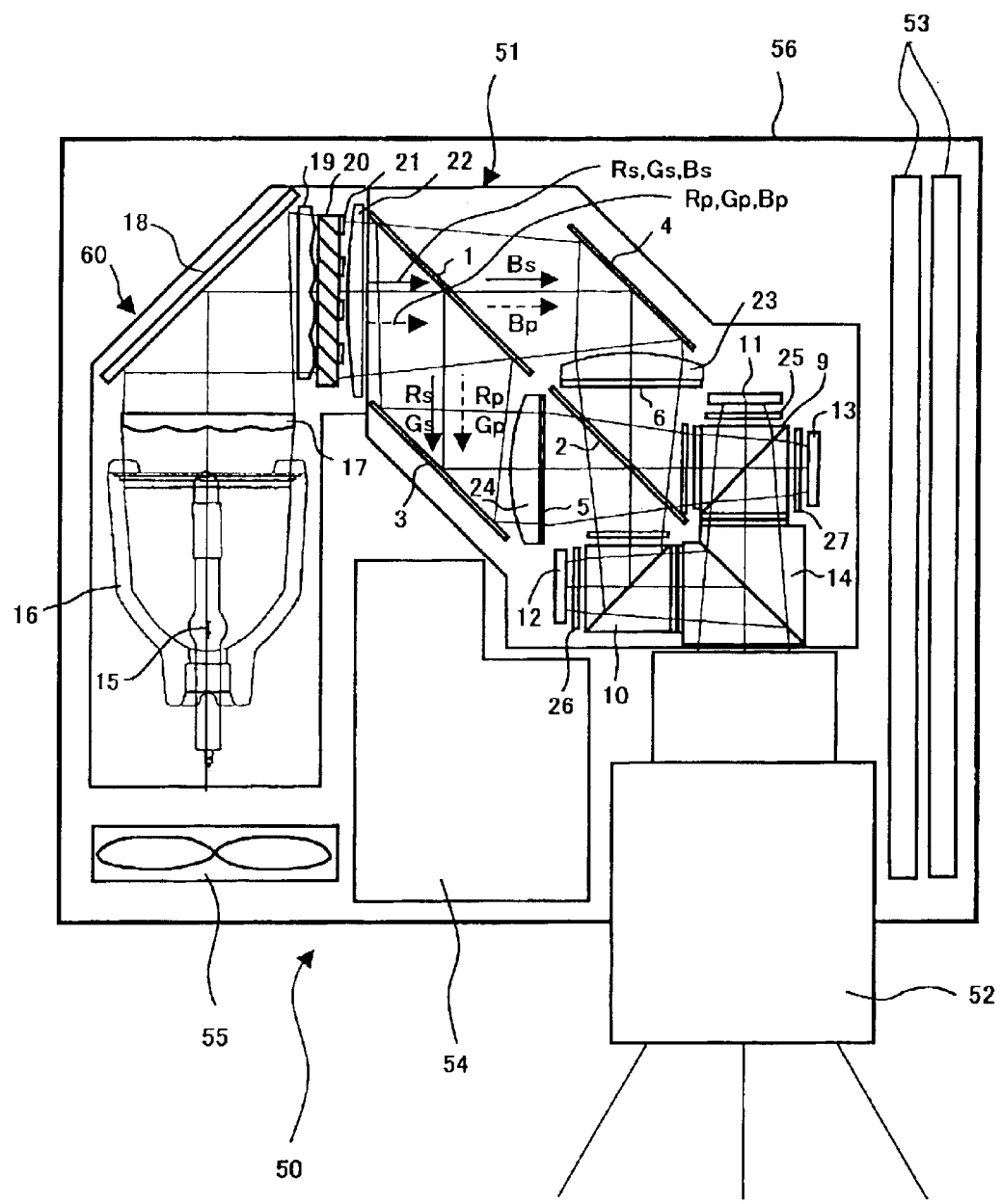
FIG. 2 is a diagram illustrating a projector in a first preferred embodiment according to the present invention.

FIG. 2 is a diagram illustrating a projector in a first preferred embodiment according to the present invention. The direction toward the front on the plane of the drawing sheet corresponds to the upward direction.

A projector 50 has an illumination optical system 60, a projection optical system 51, and the three pieces of LCLVs 11, 12 and 13 included in the projection optical system 51; a projecting lens 52; a group of circuit boards 53; a power source 54 for supplying a voltage to the light source 15 and the group of circuit boards 53; a fan 55 for cooling the light source 15; and a casing 56 containing these component parts inside thereof. Configuration of the projection optical system 51 is similar to that of the projection optical system illustrated in FIG. 1. Furthermore, other fans for cooling the LCLVs, not shown, are housed inside of the casing 56. The group of circuit boards 53 mounts thereon a drive circuit for driving the LCLV, a control circuit for controlling the projector 50, an interface circuit for inputting a image signal from the outside, a image processing circuit for processing the image signal, and the like. Upon receipt of the image signal from the outside, images corresponding to the three LCLVs are generated by the image processing circuit and the LCLV drive circuit. The projection optical system 51 illuminates the LCLVs, and then, synthesizes the image light beams modulated by the LCLVs. Thereafter, the projecting lens 52 projects a color image on a screen, not shown.

The illumination optical system 60 includes a light source 15, the reflector 16, an optical integrator, and a polarization/conversion optical system. In FIG. 2, the light beam from the light source 15 is condensed by and reflected on the reflector 16, and then, enters into the optical integrator and the polarization/conversion optical system. The light source is, for example, an ultra high-pressure Hg lamp or a metal halide lamp. The optical integrator and the polarization/conversion optical system are disclosed in, for example, U.S. Pat. No. 6,084,714, and include: a first lens array 17; a reflection mirror 18; a second lens array 19; a PBS array 20 and a superimposing lens 22. On the PBS array 20 are arrayed half-wave plates 21 in a stripe manner.

The light beam emitted through the optical integrator and the polarization/conversion optical system passes through the above-described projection optical system 51, and then, is projected on the screen, not shown, through the projecting lens 52. In the projection optical system 51, a first condenser lens 23 and a second condenser lens 24 are arranged immediately before the incident side of the phase plate 6 and the polarizing plate 5, respectively. These condenser lenses are adapted to illuminate each of the LCLVs in a telecentric fashion. The characteristics of the color-separating mirror and the PBS are varied according to an incident angle. Therefore, if the incident angles of the light beams that illuminate the LCLVs are different from position to position, the illumination conditions such as color characteristics or polarization characteristics are varied on the LCLV, thereby resulting in the occurrence of variations in illuminance or color. In order to prevent such occurrence, the LCLVs are illuminated at every position thereof in a telecentric fashion under the same illumination condition.

Moreover, quarter-wave plates 25, 26 and 27, designed specifically for each of the colors, for correcting the contrast are arranged immediately before the incident sides of the LCLVs 11, 12 and 13, respectively. Each of these quarter-wave plates is adapted to correct a decrease in extinction factor, which is generated by the difference in incident plane with respect to a polarization separation plane between the case where the light beam enters into the PBS and the case where the light beam is reflected by the LCLV and enters into the PBS again, so as to enhance the contrast of a projected image. Each of the quarter-wave plates 25, 26 and 27 is stuck to a glass plate held rotatably on the optical axis. The contrast can be corrected by rotating the quarter-wave plate on the optical axis. Theoretically, the contrast can be corrected by making the slow axis of the quarter-wave plate accord with the P polarization plane or the S polarization plane, however, decrease in contrast generated due to an error of each of the component parts or an assembly error is actually corrected by rotating the phase plate.

In FIG. 2, solid arrows indicate the light beams necessary for the image projection; in contrast, broken arrows indicate the light beams unnecessary for the image projection. Hereinafter, the light beam necessary for the image projection is referred to as an effective light beam; in contrast, the light beam unnecessary for the image projection is referred to as an unnecessary light beam. Here, the effective light beam after the modulation by the LCLV corresponds to the ON light beam (i.e., the image light beam); in contrast, the unnecessary light beam after the modulation by the LCLV corresponds to the OFF light beam. As shown in FIG. 2, the light beam, which has been emitted from the light source 15 through the optical integrator and the polarization/conversion optical system, consists of mainly the effective red, green and blue light beams $R_S$, $G_S$ and $B_S$ of the S polarization and partly the unnecessary red, green and blue light beams $R_P$, $G_P$ and $B_P$ of the P polarization in mixture. When these light beams enter into the first color-separating mirror 1, the effective red and green light beams $R_S$ and $G_S$ and the unnecessary red and green light beams $R_P$ and $G_P$ are reflected to travel toward the reflection mirror 3 while the effective blue light beam $B_S$ and the unnecessary blue light beam $B_P$ pass to travel toward the reflection mirror 4.

Figure 3:
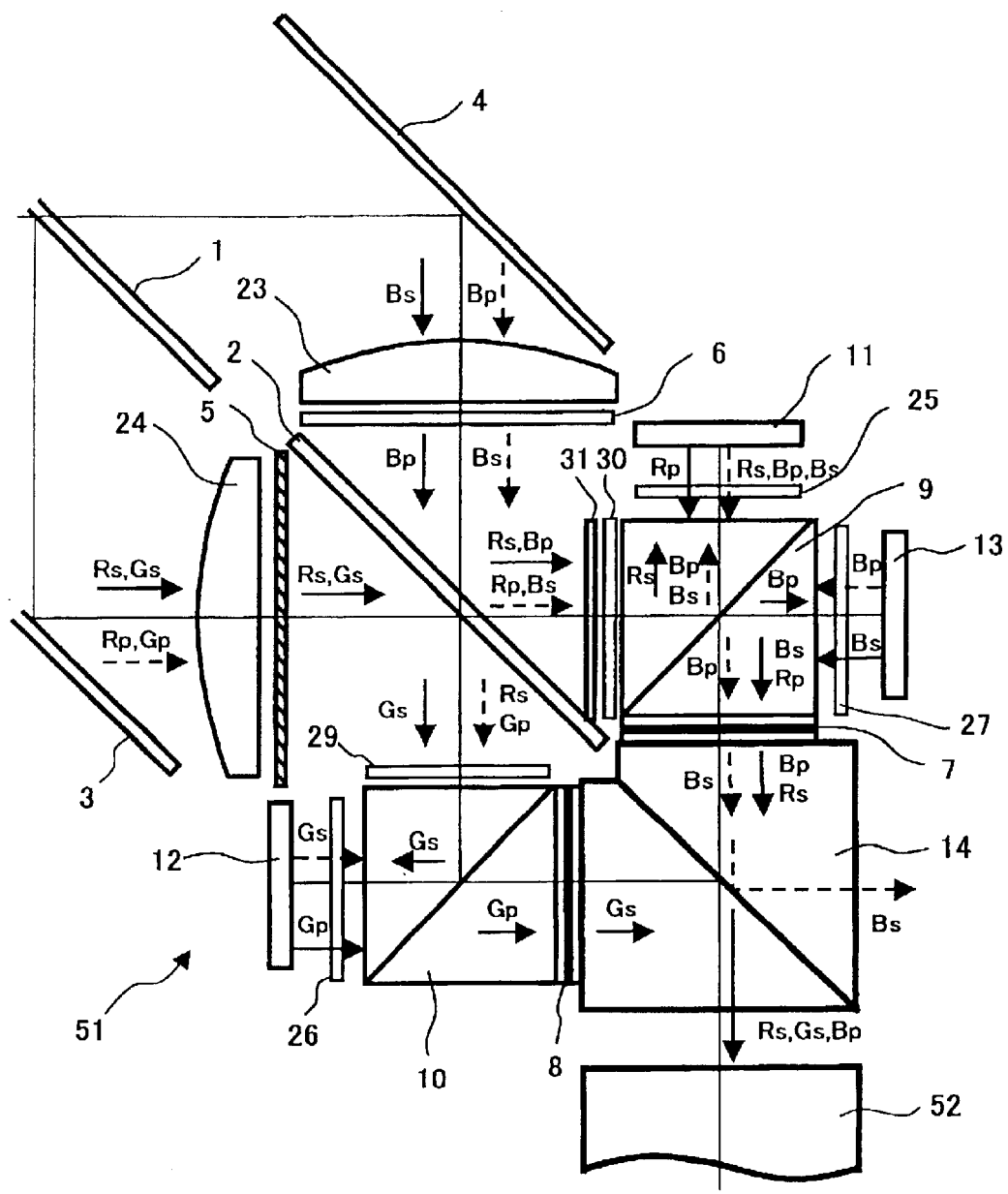
FIG. 3 is a diagram illustrating a projection optical system in enlargement in the first preferred embodiment.

FIG. 3 is a diagram illustrating the projection optical system 51 in enlargement. In FIG. 3, solid arrows indicate the effective light beams required for the image projection; in contrast, broken arrows indicate the unnecessary light beams. As shown in FIG. 3, out of the light beams which have traveled from the reflection mirror 3 through the second condenser lens 24, the effective red and green light beams $R_S$ and $G_S$ pass thorough the polarizing plate 5. Thereafter, the green light beam $G_S$ is reflected on the second color-separating mirror 2, and then, travels toward the second PBS 10. In the meantime, the red light beam $R_S$ passes through the second color-separating mirror 2, and then, travels toward the first PBS 9.

Incidentally, the red light beam $R_S$ is partly reflected on the second color-separating mirror 2, and then, travels toward the second PBS 10 as the unnecessary light beam. This unnecessary red light beam $R_S$ does not influence on the contrast, although it results in the slight mixture of the red light beam R into the effective green light beam G; nevertheless, in the case where the unnecessary red light beam R is to be cut, a filter for cutting the red light beam R may be inserted on the way of the optical path.

Furthermore, the effective blue light beam $B_S$ and the unnecessary blue light beam $B_P$, which have passed through the first condenser lens 23 from the reflection mirror 4, passes through the phase plate 6, and then, are converted into the blue light beams $B_P$ and $B_S$, respectively. Both of the effective blue light beam $B_P$ and the unnecessary blue light beam $B_S$ are reflected on the second color-separating mirror 2, and then, travel toward the first PBS 9.

Otherwise, when the effective red light beam $R_S$ passes through the second color-separating mirror 2, the polarization state is varied, and therefore, the unnecessary red light beam $R_P$ is slightly generated. Moreover, when the effective green light beam $G_S$ is reflected on the second color-separating mirror 2, the polarization state is varied, and therefore, the unnecessary green light beam $G_P$ is slightly generated. In order to substantially cut these unnecessary light beams, phase plates 29 and 30 are arranged immediately before the incident sides of the second PBS 10 and the first PBS 9, respectively. The effect of each of the phase plates 29 and 30 will be described later in detail.

The effective red light beam $R_S$ and the unnecessary blue light beam $B_S$, which have entered into the first PBS 9, are reflected on the first PBS 9, and then, travel toward the first LCLV 11. Moreover, the effective blue light beam $B_P$, which has entered into the first PBS 9, passes through the first PBS 9, and then, travels toward the third LCLV 13. Incidentally, the blue light beam $B_P$ is partly reflected on the first PBS 9, and then, travels toward the first LCLV 11 as the unnecessary light beam. In the meantime, the effective green light beam $G_S$, which has entered into the second PBS 10, is reflected on the second PBS 10, and then, travels toward the second LCLV 12.

The effective red light beam $R_S$, which has entered into the first LCLV 11, is modulated per pixel by the first LCLV 11, and then, is reflected toward the first PBS 9 as the effective red light beam $R_P$ (i.e., the ON light beam) and the unnecessary red light beam $R_S$ (i.e., the OFF light beam). The unnecessary blue light beams $B_P$ and $B_S$, which have entered into the first LCLV 11, are reflected toward the first PBS 9 in the same manner.

Additionally, the effective blue light beam $B_P$, which has entered into the third LCLV 13, is modulated per pixel by the third LCLV 13, and then, is converted into the effective blue light beam $B_S$ (i.e., the ON light beam) and the unnecessary blue light beam $B_P$ (i.e., the OFF light beam), to be reflected toward the first PBS 9. In the meantime, the effective green light beam $G_S$, which has entered into the second LCLV 12, is modulated per pixel by the second LCLV 12, and then, is converted into the effective green light beam $G_P$ (i.e., the ON light beam) and the unnecessary green light beam $G_S$ (i.e., the OFF light beam), to be reflected toward the second PBS 10.

Out of the light beams which have entered into the first PBS 9 from the first LCLV 11, the unnecessary red light beam $R_S$ and the unnecessary blue light beam $B_S$ are reflected on and cut by the first PBS 9, and then, only the effective red light beam $R_P$ and the unnecessary blue light beam $B_P$ pass through the first PBS 9, and thus, travel toward the third PBS 14. Furthermore, out of the effective blue light beam $B_S$ and the unnecessary blue light beam $B_P$, which have entered into the first PBS 9 from the third LCLV 13, the effective blue light beam $B_S$ is reflected on the first PBS 9, and the unnecessary blue light beam $B_P$ is partly reflected on the first PBS 9. Both of the light beams reflected on the first PBS 9 travel toward the third PBS 14. In contrast, out of the light beams which have entered into the second PBS 10 from the second LCLV 12, the unnecessary green light beam $G_S$ is reflected on and cut by the second PBS 10, and then, only the effective green light beam $G_P$ passes through the second PBS 10, and thus, travels toward the third PBS 14.

The effective red and blue light beams $R_P$ and $B_S$ and the unnecessary blue light beam $B_P$, which have traveled from the first PBS 9, pass through the phase plate 7, and their polarization directions are rotated by 90°, so that the effective red and blue light beams $R_P$ and $B_S$ and the unnecessary blue light beam $B_P$ are converted into the effective red and blue light beams $R_S$ and $B_P$ and the unnecessary blue light beam $B_S$, respectively, and then, enter into the third PBS 14. In the meantime, the effective green light beam $G_P$ from the second PBS 10 passes through the phase plate 8, and its polarization direction is rotated by 90°, so that the effective green light beam $G_P$ is converted into the effective green light beam $G_S$, and then, enters into the third PBS 14. Finally, out of the light beams that have entered into the third PBS 14, approximately 100% of the unnecessary blue light beam $B_S$ is reflected on and cut by the third PBS 14. The effective red and blue light beams $R_S$ and $B_P$ pass through the third PBS 14 while the effective green light beam $G_S$ is reflected on the third PBS 14, so that the light beams of these three colors are synthesized together on the same axis, to be emitted to the projecting lens 52.

In the meantime, the present embodiment is configured such that no polarizing plate of an absorption type or a reflection type is disposed on the optical path of the blue light beam B. This configuration will be explained below. The polarization directions of the light beams passed through the polarization/conversion optical system are not completely aligned to a same direction. Therefore, the present preferred embodiment is configured such that the polarizing plate 5 is arranged on the color-separation optical path of the red and green light beams R and G, so that the planes of polarization are completely aligned to the same direction, and thereafter, the red and green light beams R and G are allowed to enter into the first and second PBSs 9 and 10, respectively. Thus, the polarization degree is secured in the optical path of the red and green light beams R and G.

In general, in the case where the polarized light beam passes through the PBS, the PBS can cut the S polarized light beam at almost 100% in view of the characteristics of the PBS. Consequently, almost 100% of the transmitted light beam is the P polarized light beam, thereby achieving a high polarization degree. In contrast, in the case where the PBS reflects the polarized light beam, the unnecessary P polarized light beam also is partly reflected in addition to the inherent reflection of the S polarized light beam, and therefore, the P polarized light beam is mixed into the reflected light beam in addition to the S polarized light beam. In order to enhance the contrast of the projected image, a high polarization degree must be achieved on both of the illumination optical path for illuminating the LCLV and a synthesizing optical path after the reflection by the LCLV.

Here, as to the blue light beam B, the illumination light beam passes through the first PBS 9, and thereafter, illuminates the third LCLV 13, so that the image light beam (i.e., the ON light beam) is reflected on the first PBS 9, and then, passes through the third PBS 14 via the phase plate 7 serving as the half-wave plate. That is to say, the blue light beam B passes through the first PBS 9 on the optical path of color-separation while it passes through the third PBS 14 on the optical path of the synthesizing. The light beam that has passed through the PBS, has the very high polarization degree, and therefore, does not require any polarizing plate. Nevertheless, if a polarizing plate is used, the optical utilizing efficiency may be reduced since the polarizing plate may absorb the light beam or reflect it thereon.

Figure 4:
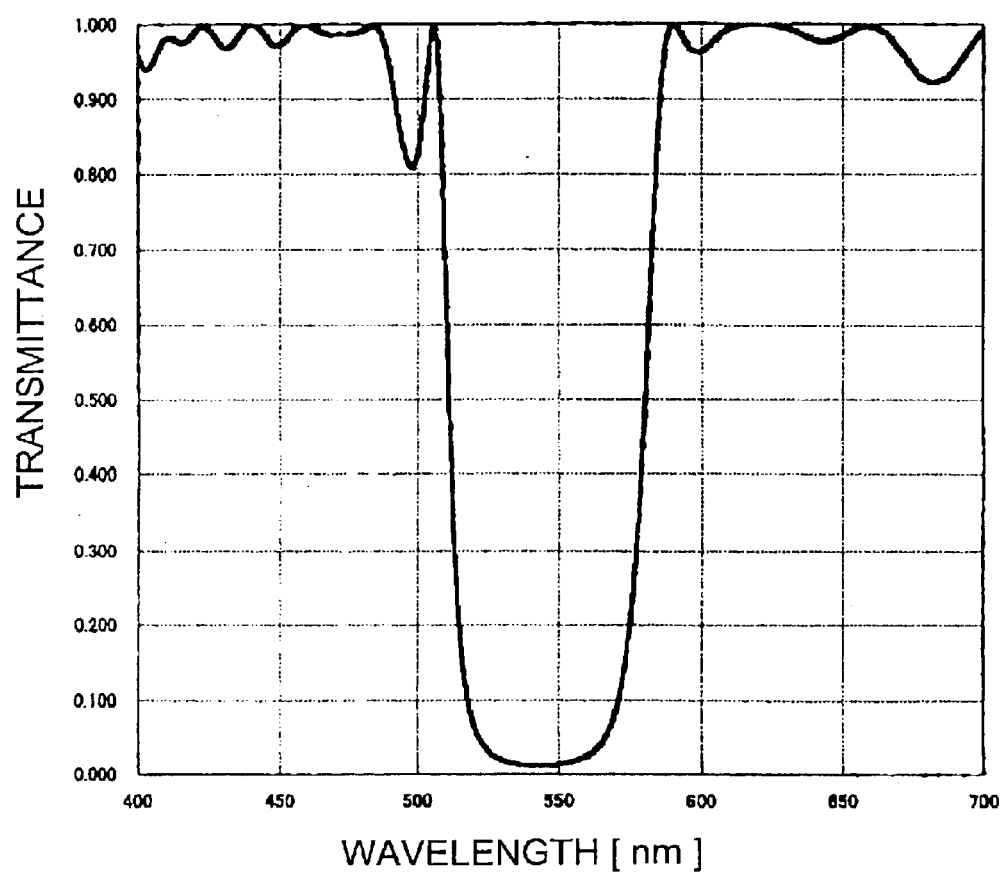
FIG. 4 is a graph illustrating the characteristics of a filter for cutting a light beam in a second color band.

Subsequently, a description will be given below of the configuration for enhancing the color purity. As shown in FIG. 3, a filter 31 for cutting the green light beam G is arranged immediately before the position at which the red and blue light beams R and B enter into the first PBS 9 in the present preferred embodiment. FIG. 4 is a graph illustrating the characteristics of the filter 31, in which the abscissa represents the wavelength (unit: nm) and the ordinate represents the transmittance. Table 1 below shows the layer configuration of the filter 31. In Table 1, figures listed in a left column represent numbers of laminated layers; figures listed in a middle column represent refractive indexes (Ni) of layers; and figures listed in a right column represent optical thicknesses of layers (wherein a reference wavelength $\lambda_0$=544.9404 nm). Reference character d in the column of the optical thickness of the layer represents a physical thickness of a layer.

TABLE 1

| Number of laminated layers | Refractive index (Ni) | Optical thickness of layer (Ni · d/$\lambda_0$) |
|---|---|---|
| 37 | 1.00 | |
| 36 | 1.74 | 0.219 |
| 35 | 2.05 | 0.568 |
| 34 | 1.74 | 0.2 |
| 33 | 2.05 | 0.2 |
| 32 | 1.74 | 0.326 |
| 31 | 2.05 | 0.224 |
| 30 | 1.74 | 0.25 |
| 29 | 2.05 | 0.25 |
| 28 | 1.74 | 0.25 |
| 27 | 2.05 | 0.25 |
| 26 | 1.74 | 0.25 |
| 25 | 2.05 | 0.25 |
| 24 | 1.74 | 0.25 |
| 23 | 2.05 | 0.25 |
| 22 | 1.74 | 0.25 |
| 21 | 2.05 | 0.25 |
| 20 | 1.74 | 0.25 |
| 19 | 2.05 | 0.25 |

TABLE 1-continued

| Number of laminated layers | Refractive index (Ni) | Optical thickness of layer (Ni · d/$\lambda_0$) |
|---|---|---|
| 18 | 1.74 | 0.25 |
| 17 | 2.05 | 0.25 |
| 16 | 1.74 | 0.25 |
| 15 | 2.05 | 0.25 |
| 14 | 1.74 | 0.25 |
| 13 | 2.05 | 0.25 |
| 12 | 1.74 | 0.25 |
| 11 | 2.05 | 0.25 |
| 10 | 1.74 | 0.25 |
| 9 | 2.05 | 0.25 |
| 8 | 1.74 | 0.25 |
| 7 | 2.05 | 0.25 |
| 6 | 1.74 | 0.176 |
| 5 | 2.05 | 0.354 |
| 4 | 1.74 | 0.216 |
| 3 | 2.05 | 0.686 |
| 2 | 1.74 | 0.46 |
| 1 | 2.05 | 0.058 |
| 0 | 1.52 | |

Optical fluxes that pass through the second color-separating mirror 2 or the third PBS 14 have wide range of incident angle. The characteristics of the color-separating mirror and PBS are varied according to an incident angle. In consideration of the characteristics of the second color-separating mirror 2 or the third PBS 14, the red light beam R and the green light beam G are not completely separated from each other at a predetermined wavelength. Consequently, the color light beam consisting of the red light beam R and the green light beam G in mixture passes on the optical path of each of the color light beams. This leads to the degradation of the contrast or the color purity.

Normally, there may be used a filter for cutting the green light beam G and the blue light beam B on the illumination optical path of the red light beam R, for example. However, in the present embodiment, the red light beam R is mixed with the green light beam G or the blue light beam B on almost all of the optical paths, and the red light beam R singly travels only immediately before the first LCLV 11. If a filter is arranged at this position, the light beams pass there twice since both of the illumination light beam and the projection light beam pass at this position, thereby reducing the transmission efficiency. Thus, the filter 31 for cutting the green light beam G while transmitting about 90% or more of the blue light beam B is arranged at the incident position of the first PBS 9, so as to enhance the color purity and prevent any reduction of the transmission efficiency.

Otherwise, in another configuration example, a band cut filter for cutting a light beam in a narrow wavelength band between the red light beam R and the green light beam G may be disposed on the optical paths of the red light beam R and the green light beam G. Specifically, the reflection mirror 3, for example, shown in FIG. 2 is used as a narrow-band-cutting mirror. Consequently, the light beam in a predetermined narrow wavelength band between the red light beam R and the green light beam G can be cut so as to prevent the light beam consisting of the red light beam R and the green light beam G in mixture from passing through the optical path of the red light beam R or the green light beam Q thereby enhancing the color purity.

Figure 5:
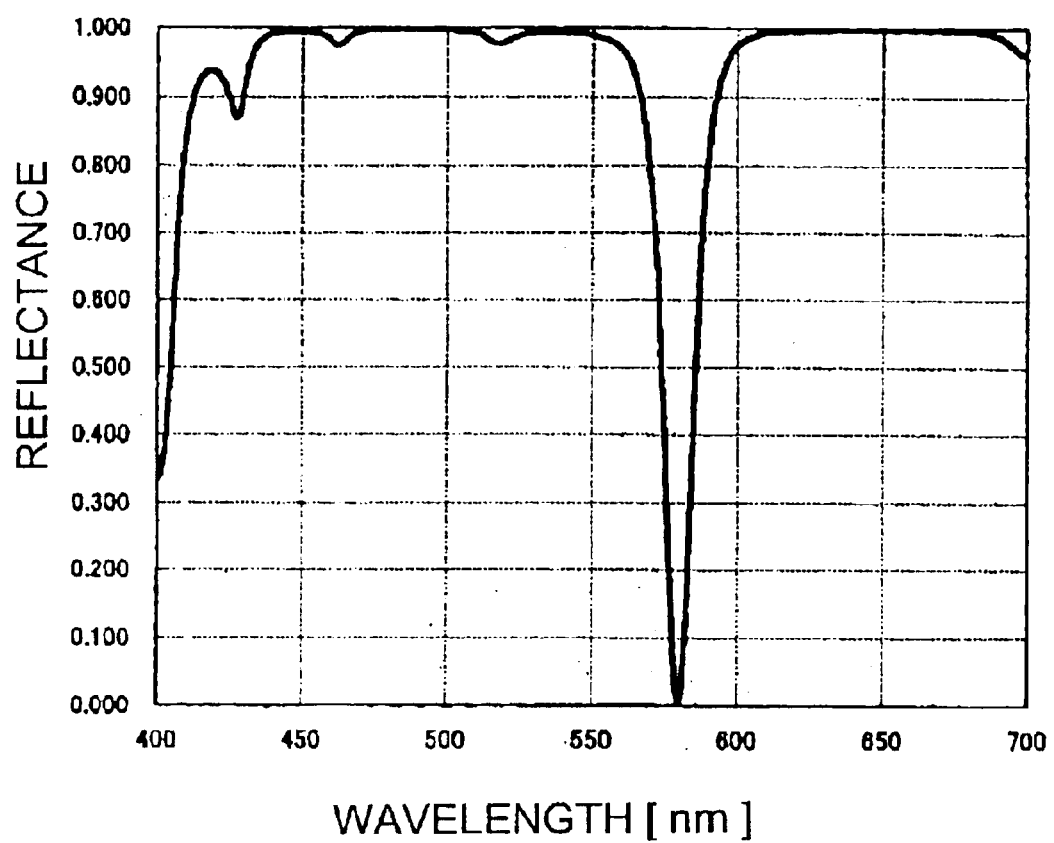
FIG. 5 is a graph illustrating the characteristics of a narrow-band-cutting mirror.

FIG. 5 is a graph illustrating the characteristics of the narrow-band-cutting mirror, in which the abscissa represents the wavelength (unit: nm) and the ordinate represents the reflectance. Table 2 below shows the layer configuration of the mirror. In Table 2, figures listed in a left column represent numbers of laminated layers; figures listed in a middle column represent refractive indexes (Ni) of layers; and figure s listed in a right column represent optical thickness of layers (wherein a reference wavelength $\lambda_0$=548.8585 nm). Reference character d in the column of the optical thickness of the layer represents a physical thickness of a layer.

TABLE 2

| Number of laminated layers | Refractive index (Ni) | Optical thickness of layer (Ni · d/$\lambda_0$) |
|---|---|---|
| 27 | 1.00 | |
| 26 | 2.3 | 0.280415 |
| 25 | 1.46 | 0.303942 |
| 24 | 2.3 | 0.060782 |
| 23 | 1.46 | 0.25 |
| 22 | 2.3 | 0.25 |
| 21 | 1.46 | 0.25 |
| 20 | 2.3 | 0.25 |
| 19 | 1.46 | 0.25 |
| 18 | 2.3 | 0.25 |
| 17 | 1.46 | 0.25 |
| 16 | 2.3 | 0.25 |
| 15 | 1.46 | 0.25 |
| 14 | 2.3 | 0.32707 |
| 13 | 1.46 | 0.388136 |
| 12 | 2.3 | 0.422753 |
| 11 | 1.46 | 0.345043 |
| 10 | 2.3 | 0.345043 |
| 9 | 1.46 | 0.345043 |
| 8 | 2.3 | 0.345043 |
| 7 | 1.46 | 0.345043 |
| 6 | 2.3 | 0.345043 |
| 5 | 1.46 | 0.345043 |
| 4 | 2.3 | 0.172151 |
| 3 | 1.46 | 0.420144 |
| 2 | 2.3 | 0.522861 |
| 1 | 1.46 | 0.75 |
| 0 | 1.52 | |

In the present embodiment, the third PBS 14 is equipped with a dichroic characteristic, the third PBS 14 transmits the red light beam R while reflects the green light beam G with respect to the S polarized light beam and a polarization/separation characteristic, by which the third PBS 14 transmits the P polarized light beam while completely reflects the S polarized light beam with respect to the blue light beam B. Therefore, the third PBS 14 transmits the S polarized red light beam R and the P polarized blue light beam B while reflects the S polarized green light beam G, and thus, synthesizes the light beams of the three colors together.

Figure 6:
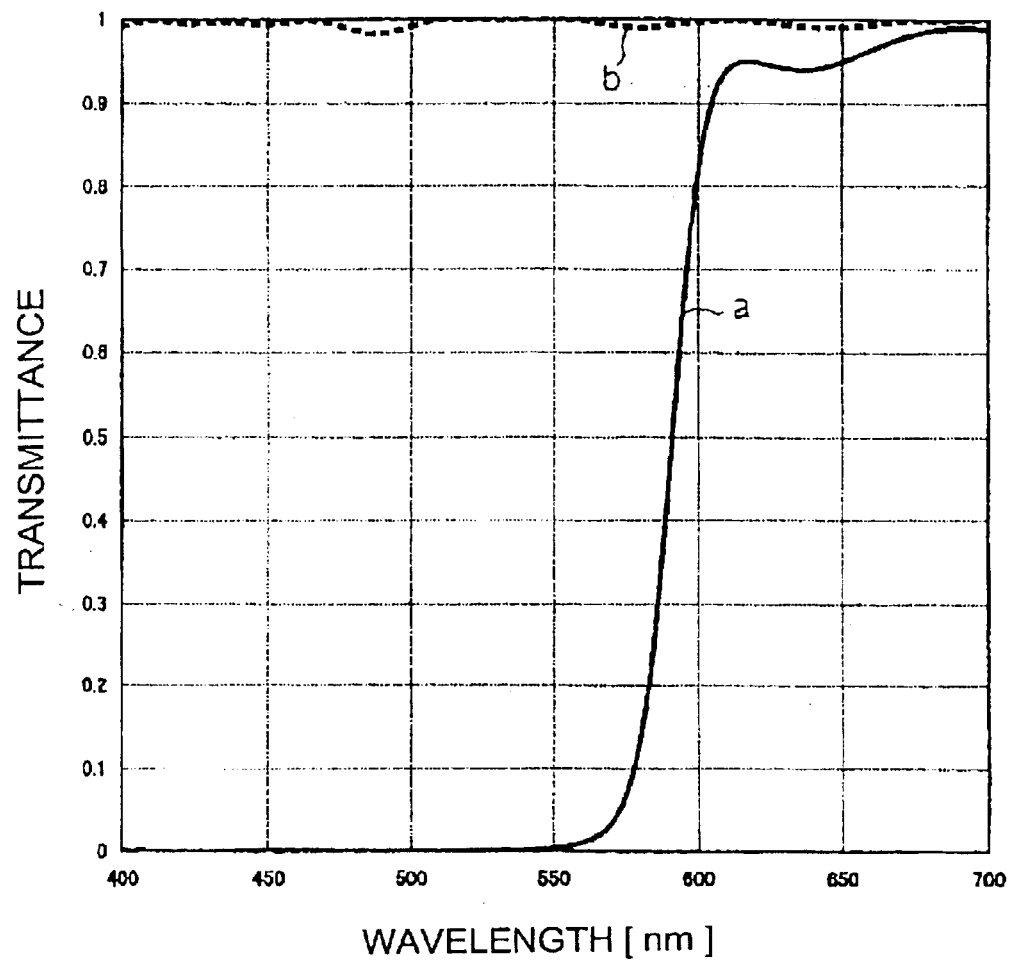
FIG. 6 is a graph illustrating the characteristics of a third polarizing beam splitter.

FIG. 6 is a graph illustrating the characteristics of the third PBS 14, in which the abscissa represents the wavelength (unit: nm) and the ordinate represents the transmittance. In FIG. 6, a curve a represents the characteristics with respect to the S polarized light beam in the case where the incident angle is 45°; in contrast, a curve b represents the characteristics with respect to the P polarized light beam in the case where the incident angle is 45°. Table 3 below shows the layer configuration of the third PBS 14. In Table 3, figures listed in a left column represent numbers of laminated layers; figures listed in a middle column represent refractive indexes (Ni) of layers; and figures listed in a right column represent optical thickness of layers (wherein a reference wavelength $\lambda_0$=649 nm). Reference character d in the column of the optical thickness of the layer represents a physical thickness of a layer.

TABLE 3

| Number of laminated layers | Refractive index (Ni) | Optical thickness of layer (Ni · d/λ₀) |
| --- | --- | --- |
| 22 | 1.62 | |
| 21 | 2.05 | 0.0273 |
| 20 | 1.385 | 0.18 |
| 19 | 2.05 | 0.0818 |
| 18 | 1.385 | 0.6435 |
| 17 | 2.05 | 0.0468 |
| 16 | 1.385 | 0.2968 |
| 15 | 2.05 | 0.3753 |
| 14 | 1.385 | 0.111 |
| 13 | 2.05 | 0.25 |
| 12 | 1.46 | 0.25 |
| 11 | 2.05 | 0.25 |
| 10 | 1.385 | 0.25 |
| 9 | 2.05 | 0.25 |
| 8 | 1.385 | 0.25 |
| 7 | 2.05 | 0.25 |
| 6 | 1.385 | 0.1035 |
| 5 | 2.05 | 0.963 |
| 4 | 1.385 | 0.2588 |
| 3 | 2.05 | 0.1225 |
| 2 | 1.385 | 0.1378 |
| 1 | 2.05 | 0.5175 |
| 0 | 1.62 | |

The normal PBS is fabricated by alternately stacking high-index layers and low index layers at every ¼-wavelength thickness, in which the layer configuration is close to the MacNeille condition. Several layers at both ends of the PBS in the present embodiment are configured in a manner different from the ¼ wavelength thickness, so that the PBS is equipped with the dichroic characteristic: the several layers at both ends include thin layers of ⅛ wavelength and thick layers of more than ½ wavelength. Although it is impossible to achieve a flat and high S polarization transmittance since ripples are generated outside of the band having the polarization separation characteristics in the normal PBS (in the band of the red light beam R in the present embodiment), the configuration of the present embodiment can achieve the flat and high S polarization transmittance.

In the projection optical system in the present embodiment, the phase plate, in which the slow axis accords with the S or P direction of the color-separating mirror on the axial principle ray, is interposed between the second color-separating mirror 2 and the first PBS 9. And, the phase plate, in which the slow axis accords with the S or P direction of the color-separating mirror on the axial principle ray, is interposed between the second color-separating mirror 2 and the second PBS 10. Specifically, the phase plates 29 and 30 are arranged immediately before the incident sides of the second PBS 10 and the first PBS 9, respectively, as shown in FIG. 3.

The optical flux that is enlarged based on the F-number (or numerical aperture) of the illumination optical system, is slightly varied in the polarization state after it passes through the second color-separating mirror 2. This is because an elliptical polarizing component is slightly produced due to a phase difference generated between the P polarized light beam and the S polarized light beam. As a consequence, the light beam other than the inherently required polarized light beam enters into the PBS, thereby degrading the contrast. Therefore, the phase plates are arranged after the transmission optical path and the reflection optical path of the second color-separating mirror 2, so that the elliptical polarization can be eliminated with respect to the red light beam R and the green light beam G, thereby removing a substantially unnecessary polarizing component. In the present embodiment, the phase plate 29 is a 233 nm λ-wave plate having a slow axis of 0° with respect to the P or S polarization direction on slow the axial principle ray; and further, the phase plate 30 is a 210 nm λ-wave plate having a axis of 0° with respect to the P or S polarization direction on the axial principle ray. The phase difference is varied depending upon the layer configuration of the second color-separating mirror 2, and therefore, it is optimized according to the layer configuration.

Figure 7A:
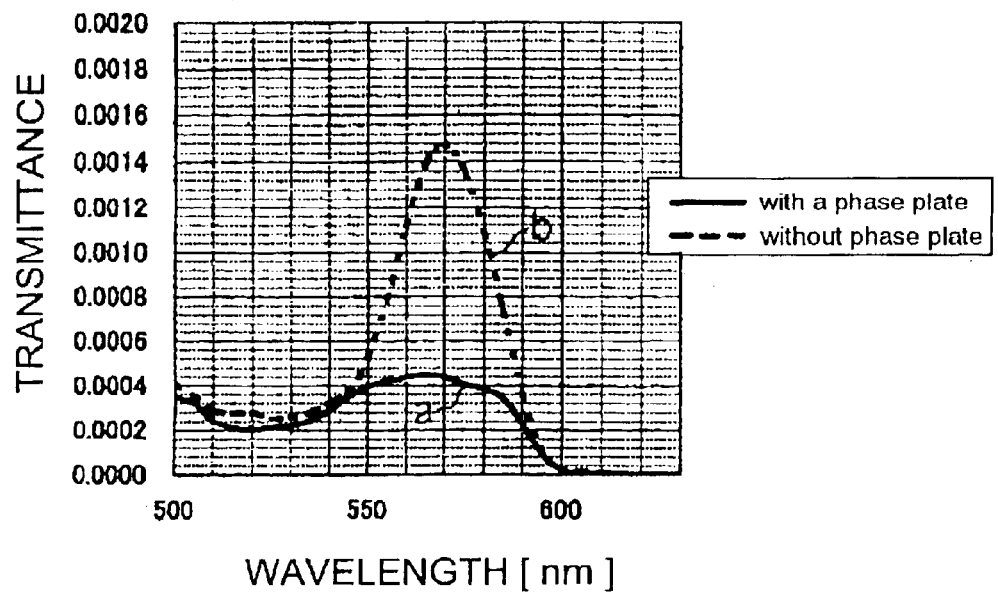
FIGS. 7A and 7B are graphs illustrating the effects of correction of the change of a polarization state, which is generated by a second color-separating mirror, by means of a phase plate.
Figure 7B:
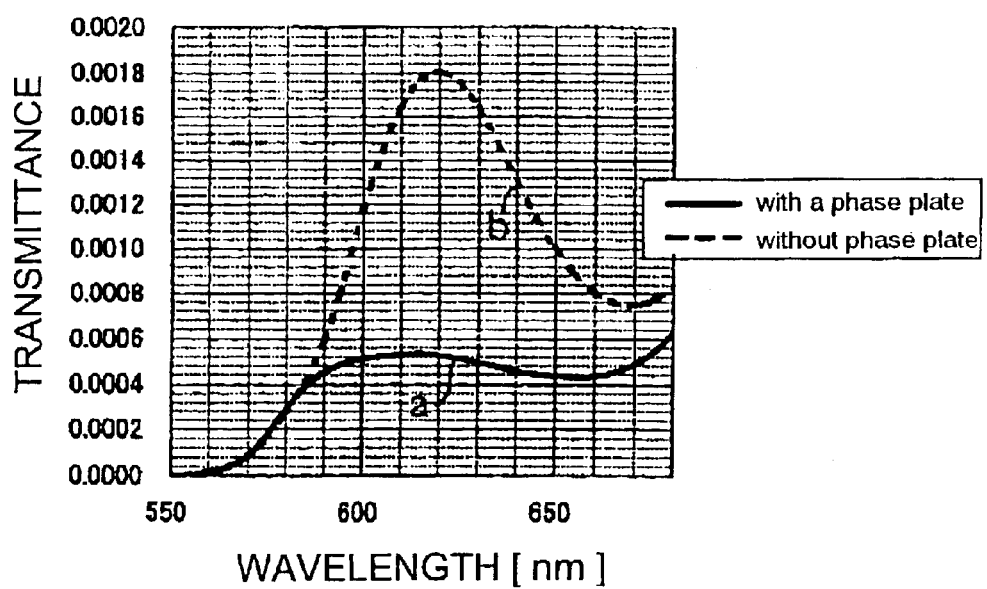

FIGS. 7A and 7B are graphs illustrating the effects of correction of the change of the polarization state, which is generated by the second color-separating mirror 2, by means of the phase plates 29 and 30, respectively. More particularly, FIG. 7A is a graph illustrating the transmittance of the unnecessary light beam in the green light beam G; and further, FIG. 7B is a graph illustrating the transmittance of the unnecessary light beam in the red light beam R. In FIGS. 7A and 7B, the abscissa represents the wavelength (unit: nm) and the ordinate represents the transmittance. Furthermore, a solid line a represents the transmittance in the case where the phase plate is provided; in contrast, a broken line b represents the transmittance in the case where no phase plate is provided. As shown in FIG. 7A, it is found that the unnecessary green light beam G can be effectively cut by arranging the phase plate 29. Moreover, as shown in FIG. 7B, it is found that the unnecessary red light beam R can be effectively cut by arranging the phase plate 30.

In the present embodiment, as shown in FIG. 2, the first condenser lens 23 and the second condenser lens 24 are arranged on the optical paths between the first color-separating mirror 1 and the second color-separating mirror 2. With this arrangement, each of the condenser lenses and the superimposing lens 22 can be reduced in size.

In the case where the above-described condenser lens is arranged on the incident side of each of the PBSs 9 and 10, each of the first and second color-separating mirrors are disposed on the optical path from the superimposing lens to the condenser lens, and so, the optical path becomes long 22. This situation is not preferable since the superimposing lens 22 or the first or second lens array becomes markedly large. Alternatively, in the case where the condenser lens is arranged on the optical path from the superimposing lens 22 to the first color-separating mirror 1, the light beams of the three colors travel together and there is produced an advantage that only a single condenser lens is sufficient. However, since the distance from the condenser lens to the LCLV becomes long, it is not preferable that the condenser lens becomes markedly large.

Figure 8:
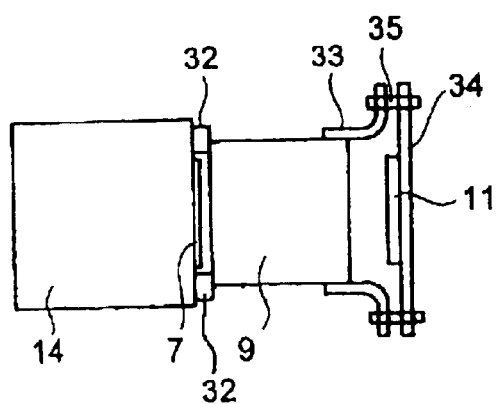
FIG. 8 is a side view schematically showing the bonding configuration of the polarizing beam splitter.

Otherwise, in the present embodiment, all of the PBSs are bonded with a glass material held therebetween. FIG. 8 is a side view schematically showing the bonding configuration of the PBS, viewed from the right side of the PBS 14 (i.e., from the side of the LCLV 13) in FIG. 2, wherein the LCLV 13, phase plate 25 and 27 are not shown. Here, as shown in FIG. 8, the phase plate 7 is stuck to one of surfaces at which the first PBS 9 and the third PBS 14 face to each other. The first PBS 9 and the third PBS 14 are bonded and fixed to each other in such a manner as to hold glass blocks 32 formed into a quadruple prism therebetween. The two glass blocks 32 formed into a quadruple prism are bonded at positions off the effective optical path of the PBS. Air gap, through which air can flow, are formed on the effective optical path between the PBSs. The second PBS 10 and the third PBS 14 are bonded and fixed to each other in the same manner.

Furthermore, when the LCLV 11 is fixed to the first PBS 9, for example, an L-shaped angle-like bracket 33 disposed on the side of the first PBS 9 and a base plate 34 disposed on the side of the LCLV 11 are connected to each other via a pin 35, followed by positioning adjustment, and thereafter, the LCLV 11 is fixed to the first PBS 9. The LCLV 12 is fixed to the second PBS 10 in the same manner. In this way, each of the PBSs and each of the LCLVs are integrated with each other.

Figure 9:
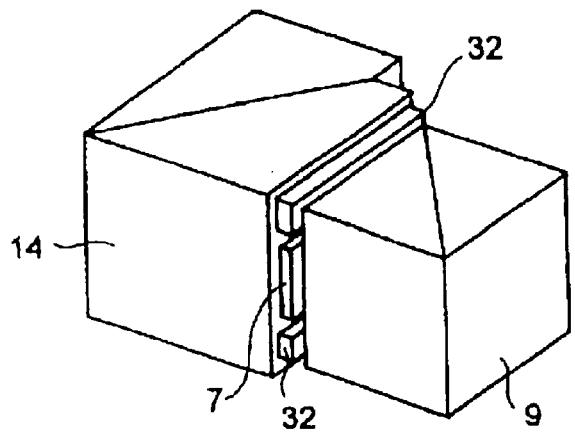
FIG. 9 is an oblique perspective view partly showing the bonding configuration of the polarizing beam splitter.

Here, when the phase plate formed of a resin film is interposed between the PBSs made of the glass material, the glass is distorted due to the difference in linear expansion coefficient or heat radiation, for example, in the case where the glass, the resin film and the glass are directly bonded to each other, thereby reducing the reliability. Thus, with the above-described configuration, mis-convergence after assembling is prevented, thus enhancing the reliability. Furthermore, air is blown through the air gap between the PBSs, thereby cooling the phase plate, which is formed of the resin film having a low resistance against the heat, and preventing the heating. Incidentally, FIG. 9 is an oblique perspective view partly showing the bonding configuration of the PBS. The opening direction of the air gap is not limited to the case of the present embodiment and optional.

Figure 10:
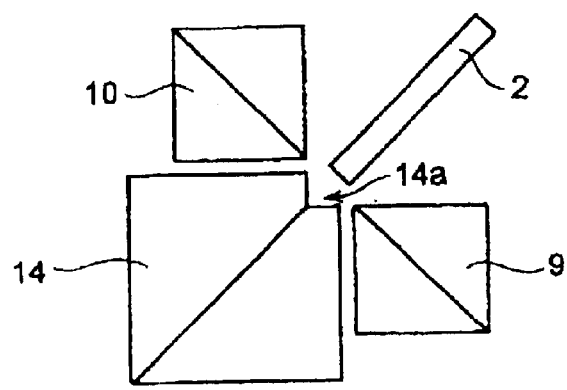
FIG. 10 illustrates the polarizing beam splitter and thereabout.

FIG. 10 illustrates the configuration of the PBS and thereabout. As illustrated in FIG. 10, in the present embodiment, a recess 14a is formed at the corner of the third PBS 14 and a portion of the third PBS 14, facing to the second color-separating mirror 2. Consequently, holding parts for the second color-separating mirror 2 can be readily arranged, and further, the lens back of the projecting lens can be shortened by reducing the size of each of the PBSs as possible.

Additionally, in the present embodiment, the first PBS 9 and the second PBS 10 are made of glass having a photoelasticity constant of $1.0 \times 10^{-12}$ (1/Pa) or less; and further, the third PBS 14 is made of glass having a photoelasticity constant of $1.0 \times 10^{-12}$ (1/Pa) or more.

The first PBS 9 and the second PBS 10 have the function of substantially cutting the OFF light beam in the projection light beam of the red light beam R and the green light beam Q that is, the S polarized unnecessary light beam and the function of generally cutting the OFF light beam in the projection light beam of the blue light beam B, that is, the P polarized unnecessary light beam. If the glass material having a great photoelasticity constant is used as the glass material of each of the PBSs, the polarization state is varied when the optical flux passes through the glass, and therefore, the unnecessary light beam leaks onto the projection side. As a result, it is desirable that the above-described glass material having a small photoelasticity constant should be used.

In the meantime, the third PBS 14 has the function of cutting the OFF light beam in the projection light beam of the blue light beam B leaking from the first PBS 9, that is, the unnecessary light beam which is converted from the P polarized light beam into the S polarized light beam by the phase plate 7. Here, since the OFF light beam has been generally cut in advance by the first PBS 9, the contrast of an image can be hardly influenced even if the polarization state is slightly varied inside of the third PBS 14. Consequently, the third PBS 14 is made of the glass material having a great photoelasticity constant, thereby desirably reducing the cost more, as described above.

Figure 11:
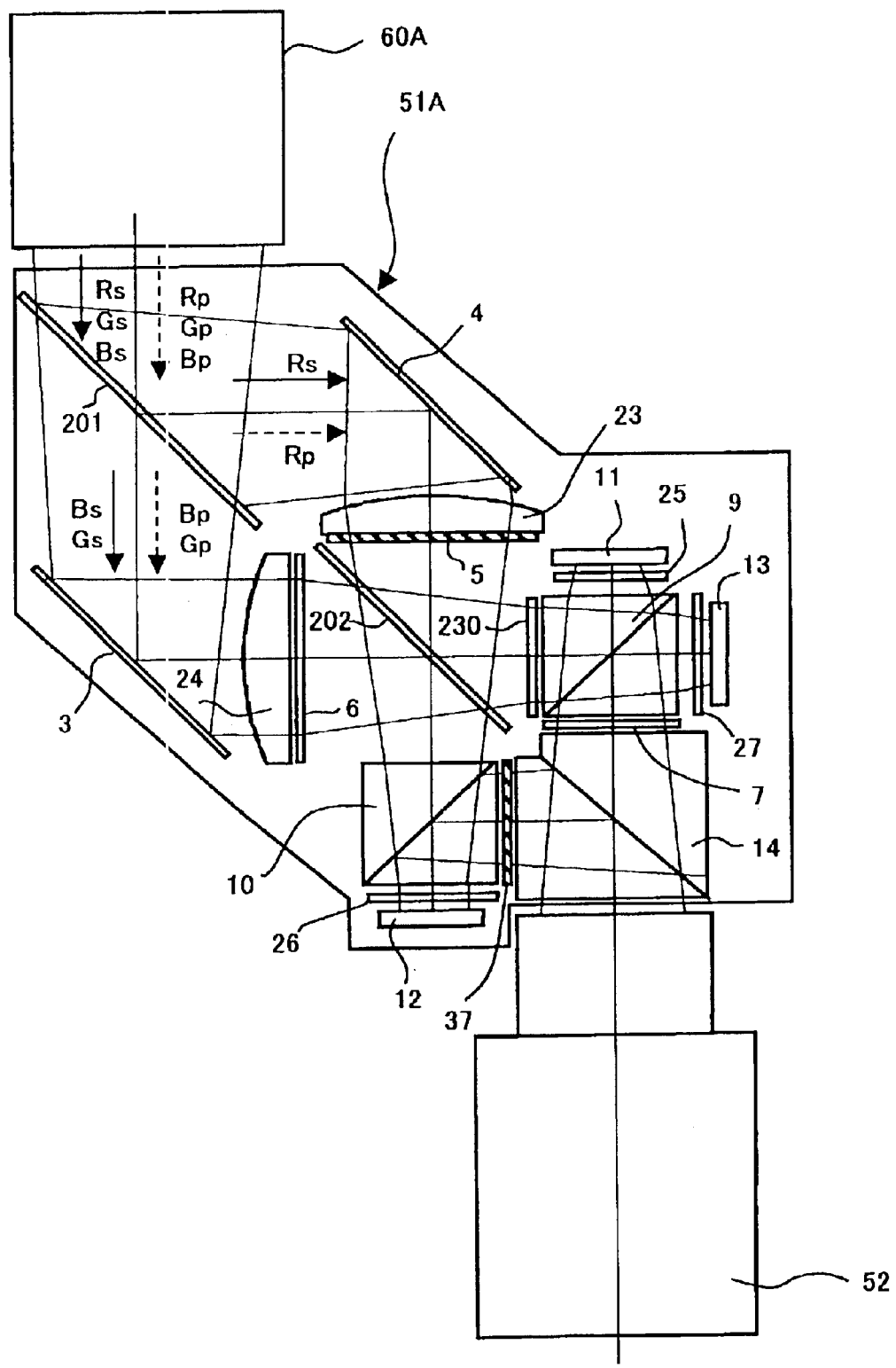
FIG. 11 is a diagram illustrating a projection optical system in a second preferred embodiment.

FIG. 11 is a diagram illustrating a projection optical system in a second preferred embodiment. An illumination optical system 60A includes: the light source; the reflector; the optical integrator; and the polarization/conversion optical system. Configuration of the projection optical system 51A is identical to those of the projection optical system 51 except for followings. In this embodiment, an incident side of a light beam emitted from an illumination optical system 60A with respect to a first color-separating mirror 201 is reverse to that in the case of the projection optical system 51 illustrated in FIG. 2. The first color-separating mirror 201 is a Red reflection dichroic mirror, which reflects a red light beam R while transmits a green light beam G and a blue light beam B.

Unlike the projection optical system 51, a polarizing plate 5 and a phase plate 6 change their places. A quarter-wave plate 26 and a second LCLV 10 are arranged such that the light beam reflected on a second color-separating mirror 202 passes through a PBS 10, before it enters into the quarter-wave plate 26 and the second LCLV 12. Furthermore, another polarizing plate 37 for transmitting an S polarized light beam is interposed between a second PBS 10 and a third PBS 14 in place of a phase plate 8. Moreover, the second color-separating mirror 2 is a red and green reflection dichroic mirror. Since the red light beam $R_S$ passes alone through the polarizing plate 5, a filter for cutting the red light beam on a side of a short wavelength may be arranged at the position of the polarizing plate 5, so as to enhance the color purity.

Furthermore, in FIG. 11, solid arrows indicate effective light beams required for image projection; and broken arrows indicate unnecessary light beams. As shown in FIG. 11, the light beam, which has been emitted from the illumination optical system 60A, consists of mainly effective S polarized red, green and blue light beams $R_S$, $G_S$ and $B_S$ and partly unnecessary P polarized red, green and blue light beams $R_P$, $G_P$ and $B_P$ in mixture, respectively. When these light beams enter into the first color-separating mirror 201, the effective red light beam $R_S$ and the unnecessary red light beam $R_P$ are reflected on the first color-separating mirror 201, and then, travels toward a reflection mirror 4; in the meantime, the effective green and blue light beams $G_S$ and $B_S$ and the unnecessary green and blue light beams $G_P$ and $B_P$ pass through the first color-separating mirror 201, and then, travel toward a reflection mirror 3.

Figure 12:
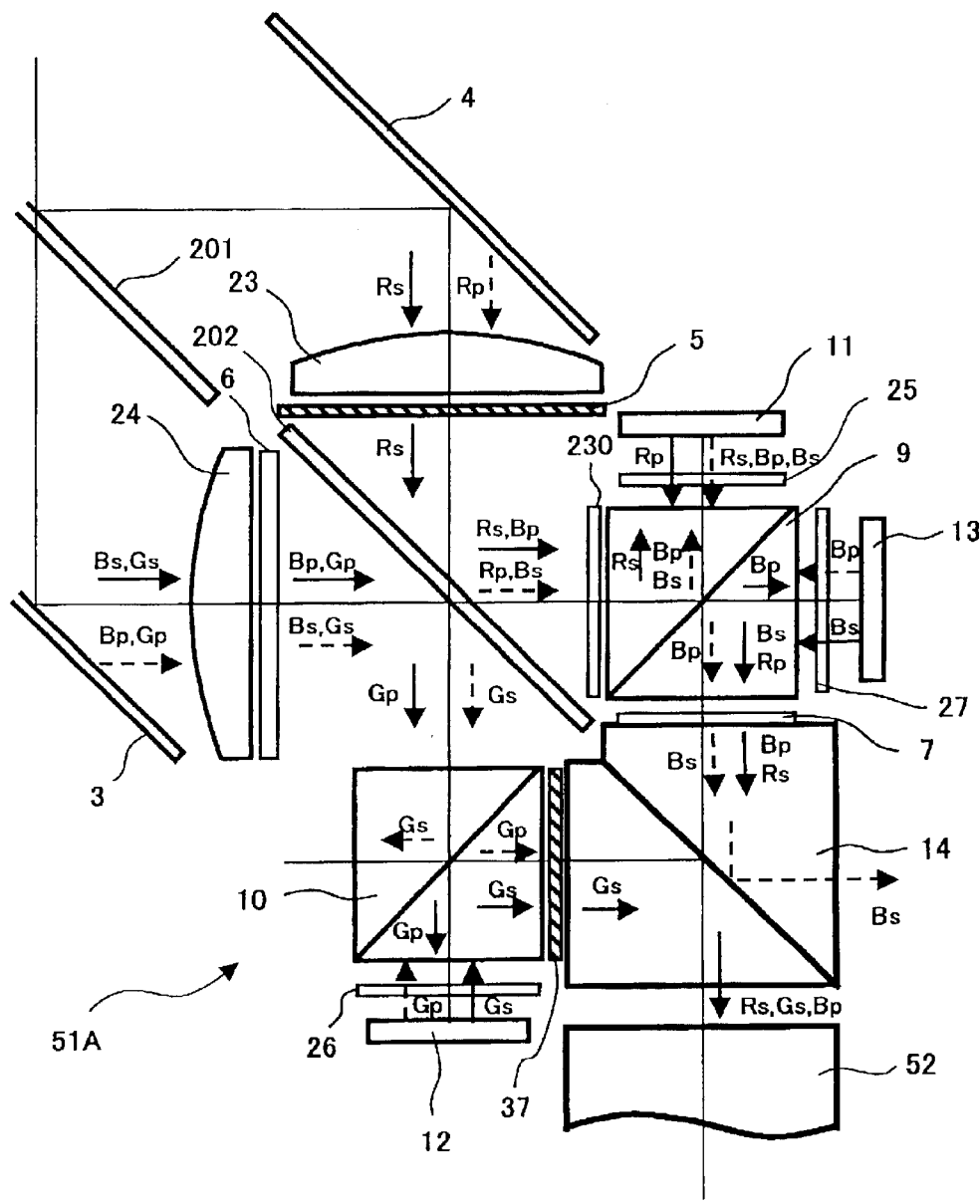
FIG. 12 is a diagram illustrating the projection optical system in enlargement in the second preferred embodiment.

FIG. 12 is a diagram illustrating the projection optical system 51A in enlargement. As shown in FIG. 12, the effective red light beam $R_S$ traveling from the reflection mirror 4 through a first condenser lens 23 passes thorough the polarizing plate 5. Thereafter, the effective red light beam $R_S$ is reflected on the second color-separating mirror 202, and then, travels toward a first PBS 9. Furthermore, the effective green light beam $G_S$, the effective blue light beam $B_S$, the unnecessary green light beam $G_P$, and the unnecessary blue light beam $B_P$, which travel from the reflection mirror 3 through a second condenser lens 24, pass through the phase plate 6, and then, are converted into the green light beam $G_P$, the blue light beam $B_P$, the green light beam $G_S$ and the blue light beam $B_S$, respectively.

The effective green light beam $G_P$ and the unnecessary green light beam $G_S$ are reflected on the second color-separating mirror 202, and then, travels toward the second PBS 10. In contrast, the effective blue light beam $B_P$ and the unnecessary blue light beam $B_S$ pass through the second color-separating mirror 202, and then, travel toward the first PBS 9. Incidentally, when the effective red light beam $R_S$ is reflected on the second color-separating mirror 202, the polarization state is varied, and therefore, the unnecessary red light beam $R_P$ is slightly generated. In order to substantially cut the unnecessary light beam, a phase plate 230 is arranged immediately before the incident side of the first PBS 9.

The effective red light beam $R_S$ and the unnecessary blue light beam $B_S$, which have entered into the first PBS 9, are reflected on the first PBS 9, and then, travel toward a first LCLV 11. Moreover, the effective blue light beam $B_P$, which has entered into the first PBS 9, passes through the first PBS 9, and then, travels toward a third LCLV 13. Incidentally, the blue light beam $B_P$ is partly reflected on the first PBS 9, and then, travels as the unnecessary light beam toward the first LCLV 11. In the meantime, the effective green light beam $G_P$, which has entered into the second PBS 10, passes through the first PBS 9, and then, travels toward the second LCLV 12. Moreover, the unnecessary green light beam $G_S$, which has entered into the second PBS 10, is reflected on and cut by the second PBS 10.

The effective red light beam $R_S$, which has entered into the first LCLV 11, is modulated per pixel by the first LCLV 11, and then, is converted into the effective red light beam $R_P$ (i.e., the ON light beam) and the unnecessary red light beam $R_S$ (i.e., the OFF light beam), to be reflected toward the first PBS 9. The unnecessary blue light beams $B_P$ and $B_S$, which have entered into the first LCLV 11, are reflected toward the first PBS 9 in the same manner.

Additionally, the effective blue light beam $B_P$, which has entered into the third LCLV 13, is modulated per pixel by the third LCLV 13, and then, is converted into the effective blue light beam $B_S$ (i.e., the ON light beam) and the unnecessary blue light beam $B_P$ (i.e., the OFF light beam), to be reflected toward the first PBS 9. In the meantime, the effective green light beam $G_P$, which has entered into the second LCLV 12, is modulated per pixel by the second LCLV 12, and then, is converted into the effective green light beam $G_S$ (i.e., the ON light beam) and the unnecessary green light beam $G_P$ (i.e., the OFF light beam), to be reflected toward the second PBS 10.

Out of the light beams which have entered into the first PBS 9 from the first LCLV 11, the unnecessary red light beam $R_S$ and the unnecessary blue light beam $B_S$ are reflected on the first PBS 9, and then, the effective red light beam $R_P$ and the unnecessary blue light beam $B_P$ only pass through the first PBS 9, and thus, travel toward the third PBS 14. The effective blue light beam $B_S$ and a part of the unnecessary blue light beam $B_P$, which have entered into the first PBS 9 from the third LCLV 13, are reflected on the first PBS 9, and then, travel toward the third PBS 14.

Out of the light beams which have entered into the second PBS 10 from the second LCLV 12, the effective green light beam $G_S$ and a part of the unnecessary green light beam $G_P$ are reflected on the second PBS 10, and then, travel toward the third PBS 14. The unnecessary green light beam $G_P$ is cut by the polarizing plate 37, while the effective green light beam $G_S$ only enters into the third PBS 14.

The effective red and blue light beams $R_P$ and $B_S$ and the unnecessary blue light beam $B_P$, which have traveled from the first PBS 9, pass through the phase plate 7, and their polarization directions are converted into those of the effective red and blue light beams $R_S$ and $B_P$ and the unnecessary blue light beam $B_S$, respectively, which then enter into the third PBS 14. Finally, out of the light beams, which have entered into the third PBS 14, the unnecessary blue light beam $B_S$ is reflected on the third PBS 14; in contrast, the effective red and blue light beams $R_S$ and $B_P$ pass through the third PBS 14 while the effective green light beam $G_S$ is reflected on the third PBS 14, so that the light beams of these three colors are synthesized, to be emitted to a projecting lens 52.

Incidentally, in the case where a projector is configured based on the projection optical system 51A illustrated in FIG. 11, an illumination optical system 60A, projecting lens 52, a power source 54, a circuit board 53 and the like may be appropriately arranged according to the projection optical system 51A, in which the basic configuration is the same as the projector illustrated in FIG. 2.

Figure 13:
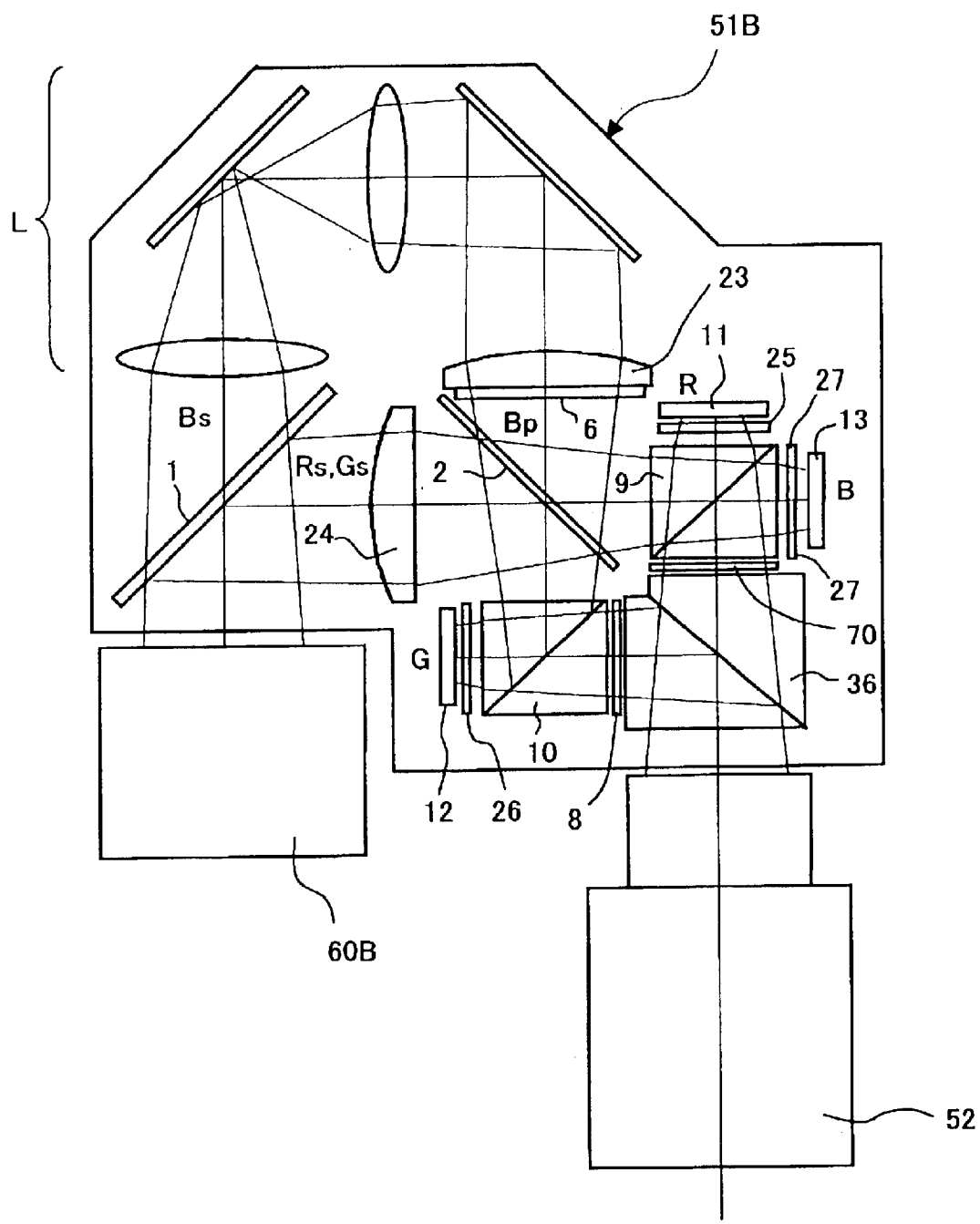
FIG. 13 is a diagram illustrating a projection optical system in a third preferred embodiment.

FIG. 13 is a diagram illustrating a projection optical system in a third preferred embodiment. An illumination optical system 60B includes: the light source; the reflector; the optical integrator; and the polarization/conversion optical system. Configuration of the projection optical system 51B is identical to those of the projection optical system 51 except for followings. In the projection optical system 51B, a first color-separating mirror 1 is a yellow reflection dichroic mirror similar to that in the projection optical system 51 in the first embodiment, but its arrangement is different from that of the projection optical system 51. The projection optical system 51B is configured such that a red light beam $R_S$ and a green light beam $G_S$ reflected on the first color-separating mirror 1 travel directly toward a second color-separating mirror 2 while a blue light beam $B_S$ which has passed through the first color-separating mirror 1, passes through a relay optical system L, before it travels toward the second color-separating mirror 2.

Furthermore, in the third preferred embodiment, a color selective phase plate 70 is used in place of a phase plate 7. The color selective phase plate 70 has such characteristics that the plane of polarization of the blue light be am $B_S$, which has passed through the color selective phase plate 70, is rotated by 90°, to be thus turned into a blue light beam $B_P$ while a red light beam $R_P$ passes therethrough as it is. Consequently, the red light beam R and the blue light beam B are aligned into a P polarized light beam; in contrast, the green light beam G is an S polarized light beam. Therefore, a third PBS, into which the light beams R, B and G enter, need not have dichroic characteristics. As a consequence, in this projection optical system 51B, a third PBS 36 having normal polarization separation characteristics is arranged in place of the third PBS 14 in the above-described embodiments. This configuration using the color selective phase plate 70 can be available in the first or the second preferable embodiments.

Incidentally, in the case where a projector is configured by using the projection optical system 51B, an illumination optical system 60B, a projection lens 52, a power source 54, a circuit board 53 and the like may be appropriately arranged according to the projection optical system 51B, in which the basic configuration is the same as that of the projector illustrated in FIG. 2.

Otherwise, each of the projection optical systems in the above-described embodiments may be configured such that the red light beam R and the blue light beam B are replaced with each other.

Furthermore, in the case of a LCLV having an ultra high resolution, there arises a problem of color mis-registration caused by the chromatic difference of magnification of each of red, green and blue colors in the projecting lens. In this case, a glass plate, to which a contrast correcting phase plate is stuck, is replaced by a weak lens having slight optical power per color R. G or B, thereby reducing the chromatic difference of magnification of each of the red, green and blue colors.

In the case of a wide-angle projecting lens, the chromatic difference of magnification is small between the red light beam R and the blue light beam B while the chromatic difference of magnification of the red light beam R and the blue light beam B is great with respect to the green light beam G. Therefore, a polarization rotating phase plate between the first PBS and the third PBS or a polarization rotating phase plate or a polarizing plate between the second PBS and the third PBS is held on a glass plate, and then, a remarkably gentle curvature is applied to the holding glass plate. Thus, it is possible to correct the chromatic difference of magnification of the red light beam R and the blue light beam B with respect to the green light beam G.

Of course, the incident and emitted plane of the PBS may be formed into a very gentle curve. The radius of curvature for correcting the chromatic difference of magnification is as much gentle as the order of 1000 mm to several ten thousands mm.

In addition, the projecting lens 52 can be not only a refractive-type lens but also a reflection-type optical system, a catadioptric system, an optical system included a diffractive optical element, and the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A projection optical system comprising:
   a first color-separating mirror for separating a substantially polarized light into a first color light and a color light including a second color light and a third color light;
   a first phase plate for rotating a plane of polarization of the first color light or the color light including the second and third color lights;
   a second color-separating mirror for synthesizing the first color light and the third color light with each other and separating the second color light;
   a first reflection type liquid crystal light valve (LCLV) for modulating the first color light thus generating a first image light;
   a second LCLV for modulating the second color light thus generating a second image light;
   a third LCLV for modulating the third color light thus generating a third image light;
   a first polarizing beam splitter (PBS) for separating the first color light and the third color light from each other, so as to guide the separated color lights to the first LCLV and the third LCLV, respectively, and for synthesizing the first image light and the third image light;
   a second PBS for guiding the second color light to the second LCLV and emitting the second image light;
   a second phase plate disposed external to an output surface of the first PBS, the first and third image lights being emitted from the output surface; and
   a third PBS for synthesizing the first and third image lights emitted from the second phase plate and the second image light emitted from the second PBS.

2. A projection optical system in accordance with claim 1, wherein the each of image lights passes through any one(s) of the first, second, and third polarizing beam splitters at least one time.

3. A projection optical system in accordance with claim 1, wherein the second phase plate comprises half-wave plate, and the third PBS passes the third image light therethrough while reflects the second image light thereby, and wherein, with respect to the first color light, the third PBS passes a P polarized light therethrough while reflects a S polarized light.

4. A projection optical system in accordance with claim 3, wherein the first image light is reflected on the first PBS, and passes through the third PBS.

5. A projection optical system in accordance with claim 1, wherein the second phase plate comprises a color selective phase plate for rotating a plane of polarization of the first image light reflected on the first PBS 90 degrees, and for passing the third image light passed through the first PBS therethrough without rotating a plane of polarization of the third image light.

6. A projection optical system in accordance with claim 1, further comprising a filter, disposed on optical path between the second color-separating mirror and the first PBS, for eliminating the second color light.

7. A projection optical system in accordance with claim 1, further comprising a phase plate, disposed on an optical path between the second color-separating mirror and the first PBS, for correcting a polarization state changed by the second color-separating mirror.

8. A projection optical system in accordance with claim 1, further comprising a phase plate, disposed on an optical path between the second color-separating mirror and the second PBS, for correcting a polarization state changed by the second color-separating mirror.

9. A projection optical system in accordance with claim 1, further comprising a filter, disposed on an optical path of the color light, for eliminating a color band in a narrow wavelength band on the boundary between the second color light and the third color light.

10. A projection optical system in accordance with claim 1, further comprising a condenser lens, disposed on an optical path between the first color-separating mirror and the second color-separating mirror, for substantially illuminating the LCLVs in a telecentric manner.

11. A projection optical system in accordance with claim 1, the projection optical system has no polarizing plate on an optical path of the first color light.

12. A projection optical system in accordance with claim 1, wherein each of the first and second polarizing beam splitters is made of a glass having a photoelasticity constant of 1×10.12 (1/Pa) or less and the third polarizing beam splitter is made of a glass having a photoelasticity constant of 1×10.12 (1/Pa) or more.

13. A projector comprising:
   a projection optical system in accordance with claim 1; and
   an imaging optical system for projecting a synthesized image light synthesized by the third PBS to a certain plane.

14. A projector in accordance with claim 13, wherein the each image lights modulated by the LCLVs pass through any one(s) of the first, second and third PBSs at least one time.

15. A projector in accordance with claim 13, wherein the third PBS passes the third image light therethrough while reflects the second image light thereby, and wherein, with respect to the first color light, the third PBS passes a P polarized light therethrough while reflects a S polarized light thereby.

16. A projector in accordance with claim 13,
further comprising a filter, disposed on an optical path between the second color-separating mirror and the first polarizing beam splitter, for eliminating the second color light.

17. A projector in accordance with claim 13,
further comprising a phase plate, disposed on an optical path between the second color-separating mirror and the first PBS, for correcting a polarization state changed by the second color-separating mirror.

18. A projector in accordance with claim 13,
further comprising a phase plate, disposed on an optical path between the second color-separating mirror and the second polarizing beam splitter, for correcting a polarization state changed by the second color-separating mirror.

19. A projector in accordance with claim 13,
further comprising a filter, disposed on an optical path of the color light, for eliminating a color band in a narrow wavelength band on the boundary between the second color light and the third color light.

20. A projector in accordance with claim 13,
further comprising a condenser lens, disposed on an optical path between the first color-separating mirror and the second color-separating mirror, for substantially illuminating the LCLVs in a telecentric manner.

21. A projector in accordance with claim 13,
wherein the first, second and third PBSs are combined as a unit, the unit has two interfaces between the first PBS and the third PBS and between the second PBS and the third PBS, respectively, each interface is configured so that a plurality glass blocks are interposed between the respective two PBSs at periphery of the interface and thereby an air gap is formed at an effective optical path of the interface.

22. A projection optical system comprising:
a first LCLV for modulating a first color light thus generating a first image light;
a second LCLV for modulating a second color light thus generating a second image light;
a third LCLV for modulating a third color light thus generating a third image light;
a first PBS for separating the first color light and the third color light different in color and in plane of polarization each other, so as to guide the separated lights to the first LCLV and the third LCLV, respectively, and further, for synthesizing the first image light and the third image light;
a second PBS for guiding a polarized second color light to the second LCLV and emitting the second image light;
a half-wave plate disposed external to an output surface of the first PBS, the first and third image lights being emitted from the output surface; and
a third PBS for synthesizing the first and third image lights emitted from the half-wave plate and the second image light emitted from the second PBS,
wherein the third PBS reflects the second image light thereby while passes the first image light therethrough by a dichroic characteristic of the third PBS, and wherein, with respect to the third image light, the third PBS reflects a S polarized light thereby while passes a P polarized light therethrough.

23. A projector comprising:
a projection optical system in accordance with claim 22; and
an imaging optical system for projecting a synthesized image light synthesized by the third PBS to a certain plane.

24. A projection optical system in accordance with claim 22,
wherein the first PBS passes the third color light and reflects the third image light, and
wherein the half-wave plate rotates a plane of polarization of the third image light 90 degrees.

* * * * *

UNITED STATES PATENT AND TRADEMARK OFFICE
CERTIFICATE OF CORRECTION

PATENT NO.   : 6,789,902 B2  
DATED        : September 14, 2004  
INVENTOR(S)  : Kohtara Hayashi et al.

It is certified that error appears in the above-identified patent and that said Letters Patent is hereby corrected as shown below:

Column 20,
Lines 47 and 49, delete "1×10.12", and insert -- $1 \times 10.^{-12}$ --.

Signed and Sealed this

Third Day of May, 2005

JON W. DUDAS
*Director of the United States Patent and Trademark Office*